(12) United States Patent
Kimura et al.

(10) Patent No.: US 12,460,284 B2
(45) Date of Patent: Nov. 4, 2025

(54) FLEXIBLE STAINLESS STEEL FOIL AND FLEXIBLE LIGHT EMITTING DEVICE

(71) Applicant: NIPPON STEEL Chemical & Material Co., Ltd., Tokyo (JP)

(72) Inventors: Keiichi Kimura, Tokyo (JP); Yuuki Yoshida, Tokyo (JP); Takuya Hiraga, Tokyo (JP); Masahiro Fukuda, Tokyo (JP); Yuji Kuma, Tokyo (JP)

(73) Assignee: NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 52 days.

(21) Appl. No.: 18/284,260

(22) PCT Filed: Mar. 30, 2022

(86) PCT No.: PCT/JP2022/016116
§ 371 (c)(1),
(2) Date: Sep. 26, 2023

(87) PCT Pub. No.: WO2022/210918
PCT Pub. Date: Oct. 6, 2022

(65) Prior Publication Data
US 2024/0150880 A1    May 9, 2024

(30) Foreign Application Priority Data
Mar. 31, 2021  (JP) .................. 2021-060087

(51) Int. Cl.
*C22C 38/58*     (2006.01)
*B32B 15/04*     (2006.01)
(Continued)

(52) U.S. Cl.
CPC .............. *C22C 38/58* (2013.01); *B32B 15/04* (2013.01); *B32B 15/18* (2013.01); *C22C 38/001* (2013.01);
(Continued)

(58) Field of Classification Search
CPC ..... C22C 38/58; C22C 38/001; C22C 38/002; C22C 38/02; C22C 38/04; C22C 38/40
(Continued)

(56) References Cited

U.S. PATENT DOCUMENTS

2006/0289868 A1    12/2006  Jeong et al.
2011/0070461 A1    3/2011   Yamada et al.
(Continued)

FOREIGN PATENT DOCUMENTS

CN    1690230 A    11/2005
JP    1-309919 A   12/1989
(Continued)

OTHER PUBLICATIONS

Ebina et all, JP-2006212686-A Google Patents Machine translation printed Mar. 3, 2025, Aug. 17, 2006, entire translation (Year : 2006).*
Steel Max, "SUS301-CSP-EH", 2019, URL: < https://steelmax.co.kr/2019/02/01/sus301-csp-eh-0-05t-spring-steel-extra-hard/>, pp. 1-6 (Year: 2019).*

*Primary Examiner* — Katherine A Christy
(74) *Attorney, Agent, or Firm* — Birch, Stewart, Kolasch & Birch, LLP

(57) ABSTRACT

Stainless steel foil with improved durability to repeated bending under the extreme bending conditions demanded of foldable displays and rollable displays. This stainless steel foil is flexible stainless steel foil comprising rolled stainless steel foil with a thickness of 0.1 mm or less, having a tensile strength of 1,800 MPa or more, and having a maximum height roughness of Rz of 0.35 μm or less obtained from a roughness curve of the stainless steel foil surface as measured in the same direction as a tensile direction.

15 Claims, 2 Drawing Sheets

(51) Int. Cl.
    *B32B 15/18*   (2006.01)
    *C22C 38/00*   (2006.01)
    *C22C 38/02*   (2006.01)
    *C22C 38/04*   (2006.01)
    *C22C 38/40*   (2006.01)
    *F21V 21/14*   (2006.01)

(52) U.S. Cl.
    CPC ............ *C22C 38/002* (2013.01); *C22C 38/02* (2013.01); *C22C 38/04* (2013.01); *C22C 38/40* (2013.01); *F21V 21/14* (2013.01); *B32B 2307/538* (2013.01); *B32B 2307/54* (2013.01); *B32B 2307/546* (2013.01); *B32B 2311/30* (2013.01); *B32B 2457/20* (2013.01)

(58) Field of Classification Search
    USPC ........................................................ 428/612
    See application file for complete search history.

(56) References Cited

U.S. PATENT DOCUMENTS

| | | |
|---|---|---|
| 2015/0261259 A1 | 9/2015 | Endo et al. |
| 2018/0229476 A1 | 8/2018 | Unno et al. |
| 2019/0071758 A1 | 3/2019 | Okamoto |

FOREIGN PATENT DOCUMENTS

| | | | |
|---|---|---|---|
| JP | 2005-307295 A | | 11/2005 |
| JP | 2006212686 A | * | 8/2006 |
| JP | 2007-11256 A | | 1/2007 |
| JP | 2007-23373 A | | 2/2007 |
| JP | 2016-75884 A | | 5/2016 |
| WO | WO2009/139495 A1 | | 11/2009 |
| WO | WO2017/030148 A1 | | 2/2017 |
| WO | WO 2017/154981 A1 | | 9/2017 |

* cited by examiner

FLEXIBLE STAINLESS STEEL FOIL AND FLEXIBLE LIGHT EMITTING DEVICE

FIELD

The invention relates to stainless steel foil with high durability to repeated bending by a small curvature and a movable light emitting device including the same.

BACKGROUND

Flexible light emitting elements that can bend, particularly organic EL elements, have been developed. In recent years, electronic devices called "foldable devices" with screens which can themselves be folded and "rollable devices" which can be stored rolled up, have been developed. An organic EL element has no strength or rigidity in itself, so often requires reinforcement on its back side. Such reinforcement is bonded to the organic EL element and must be flexible for the screen to be foldable. Stainless steel sheets or stainless steel foils are mainly selected. As the property demanded of such a reinforcement, there is durability to repeated bending. Here, "durability" specifically means that there are no bending habit and no breakage. "Bending habit" means permanent deformation that is formed after unbending and removal of the load. Furthermore, "no breaking" means that the stainless steel sheet or stainless steel foil will not crack or split due to metal fatigue caused by repeated bending.

As inventions relating to stainless steel sheet or stainless steel foil with superior fatigue properties, the measure of reducing inclusions in stainless steel foil (PTL 1) and the measure of prescribing an average peak-to-peak interval in a surface profile curve of stainless steel foil in a transverse direction to the rolling direction (PTL 2) have been disclosed.

Furthermore, as stainless steel foil for use for a flexible display substrate, stainless steel foil with an average arithmetic mean roughness (Ra) of 50 nm or less in the rolling direction of the stainless steel foil and in a transverse direction to the rolling direction has been proposed (PTL 3). As the curvature in this flexible display stainless steel foil, a relatively large curvature is envisioned according to the wording in the claims. The stainless steel foil is used as a substrate on which circuits are formed via a thin insulating film. For such a substrate, smoothness is demanded so as not to detract from the resolution of the display.

PTL 4 proposes an organic light emitting device including a flexible conductive substrate formed from stainless steel or titanium and a thin film transistor formed on the conductive substrate. This light emitting device relates to a system which applies a bias to the conductive substrate. The property demanded of the flexible substrate is conductivity. Repeated bending is not envisaged. PTL 5 recites using stainless steel as a reinforcing material for an organic EL or other light emitting panel, but groups it together with plastic, aluminum, and silicone rubber which generally have low strength. Applications with respect to the extreme repeated bending demanded in recent years have not been envisaged.

The reinforcing stainless steel sheets or foils used for the displays of foldable devices and rollable devices in recent years are being bent by smaller curvatures never before demanded in the past and are being asked to give durability with respect to large bending angles. Furthermore, when used not as substrates, but as reinforcements, the curvature demanded sometimes has to be even smaller. Moreover, these electronic devices, like with clamshell terminals, sliding terminals, and tablet terminals, are being asked to be made thinner and lighter in reinforcements. The curvatures of the bending have been becoming increasingly smaller. The metal materials sought for reinforcements are being asked to meet stricter requirements. With current materials, these are becoming harder to satisfy.

CITATIONS LIST

Patent Literature

[PTL 1] Japanese Unexamined Patent Publication No. 1-309919
[PTL 2] Japanese Unexamined Patent Publication No. 2005-307295
[PTL 3] International Publication Number 2009/139495
[PTL 4] Japanese Unexamined Patent Publication No. 2007-11256
[PTL 5] Japanese Unexamined Patent Publication No. 2016-75884

SUMMARY

Technical Problem

To raise the strength of stainless steel foil, the method of work hardening the stainless steel by rolling is generally employed. When trying to achieve high strength through rolling, the smoothness of the surface of the stainless steel foil will be detracted from by the rough surfaces of the rolls used in rolling, entrapment of rolling oil, etc. The object of the present invention is to increase durability to repeated bending under the extreme bending conditions demanded of foldable displays and rollable displays by clarifying the requirements by which the necessary durability can be obtained and to provide stainless steel foil satisfying the conflicting conditions of stainless steel foil of maximum height roughness (Rz) in the bending direction and strength which had never been sought up to now.

Solution to Problem

The present invention includes the following aspects:
(1) A flexible stainless steel foil comprising rolled stainless steel foil with a thickness of 0.1 mm or less having a tensile strength of 1,800 MPa or more and a maximum height roughness Rz of 0.35 μm or less obtained from a roughness curve of the stainless steel foil surface measured in the same direction as a tensile direction.
(2) The flexible stainless steel foil according to (1), wherein the thickness is 0.05 mm or less, a ratio of a maximum valley depth Rv to the Rz (Rv/Rz) is 0.6 or less, and an elongation at break at the time of measurement of the tensile strength is 1% or more and 2% or less.
(3) The flexible stainless steel foil according to (1) or (2), wherein,
when repeatedly bent 180° at a value satisfying R/t=100 (where R is bending radius (mm) and "t" (mm) is thickness) in the same direction as the tensile direction and then back to 0°,
a number of repeated bending operations until a crack with a length of 5 mm or more is formed on a surface of the stainless steel foil is 100,000 or more, and
bending habit is an opened angle of 170° or more.

(4) The flexible stainless steel foil according to (1) or (2), wherein the Rz is 0.30 μm or less, and, when repeatedly bent 180° at a value satisfying R/t=75 in the same direction as the tensile direction and then back to 0°, a number of repeated bending operations until a crack with a length of 5 mm or more is formed on a surface of the stainless steel foil is 100,000 or more, and bending habit is an opened angle of 170° or more when offloading.

(5) The flexible stainless steel foil according to any one of (1) to (4), wherein the stainless steel foil comprising, by mass %, C: 0.15% or less, Si: 1.00% or less, Mn: 2.00% or less, P: 0.045% or less, S: 0.030% or less, Ni: 6.00 to 8.00%, Cr: 16.00 to 18.00%, and N: 0.20% or less, and comprising a martensite phase.

(6) The flexible stainless steel foil according to any one of (1) to (5), wherein an area ratio of a martensite phase in a cross-section of the stainless steel foil is 50% or more.

(7) The flexible stainless steel foil according to any one of (1) to (6), having a planar shape flexible light emitting electronic element adhered to a surface of the stainless steel foil.

(8) The flexible stainless steel foil according to (7), wherein the flexible light emitting electronic element is an organic EL display element.

(9) A flexible light emitting device comprising the flexible stainless steel foil of any one of (1) to (6) and a planar shape flexible light emitting electronic element.

Advantageous Effects of Invention

The present invention provides stainless steel foil which satisfies the conflicting conditions of maximum height roughness in the bending direction and strength in order to increase durability to repeated bending under the extreme bending conditions demanded of foldable displays and rollable displays. Specifically, it can provide a reinforcing material for organic EL display use etc. which has a thickness of 0.1 mm or less, a tensile strength of 1,800 MPa or more, and a maximum height roughness Rz of 0.35 μm or less obtained from a roughness curve of the stainless steel foil surface measured in the same direction as the tensile direction, particularly one to be subjected to extreme repeated bending.

DESCRIPTION OF EMBODIMENTS

Modes of Use and Explanation of Terminology

Figure 1:
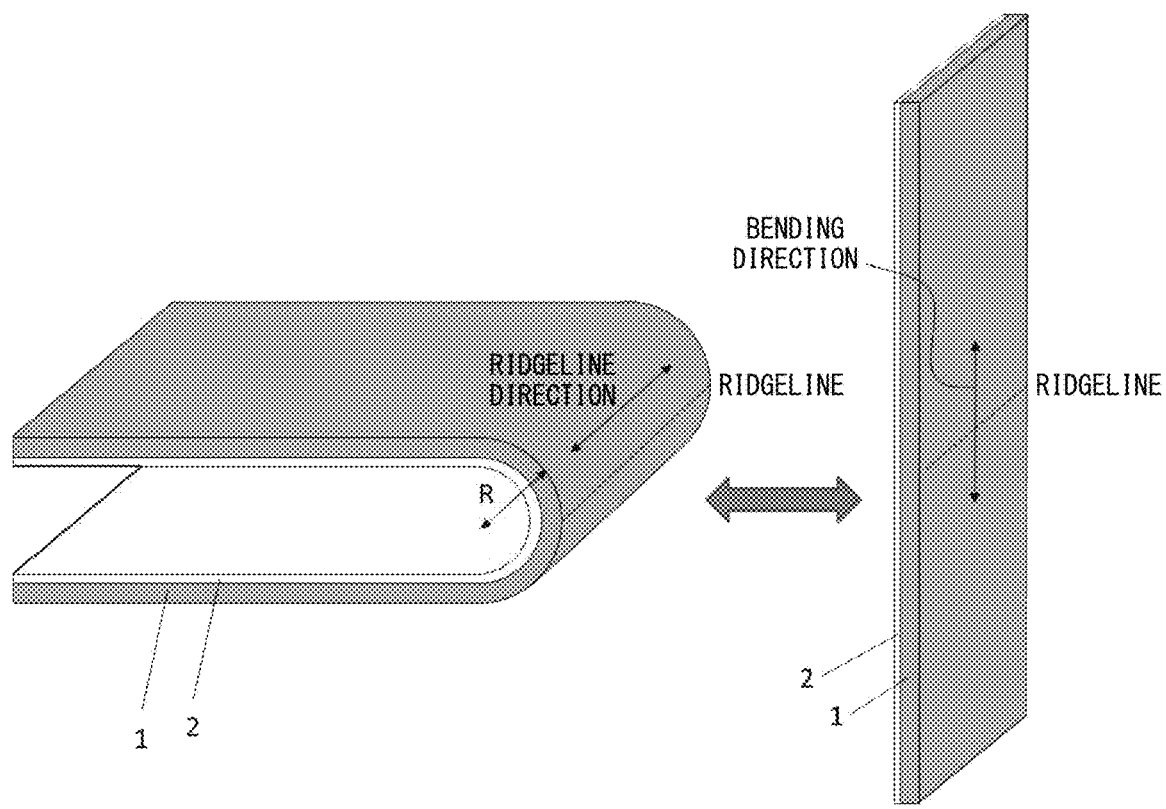
FIG. 1 is a view showing one example of a mode of use of a foldable display.
Figure 2:
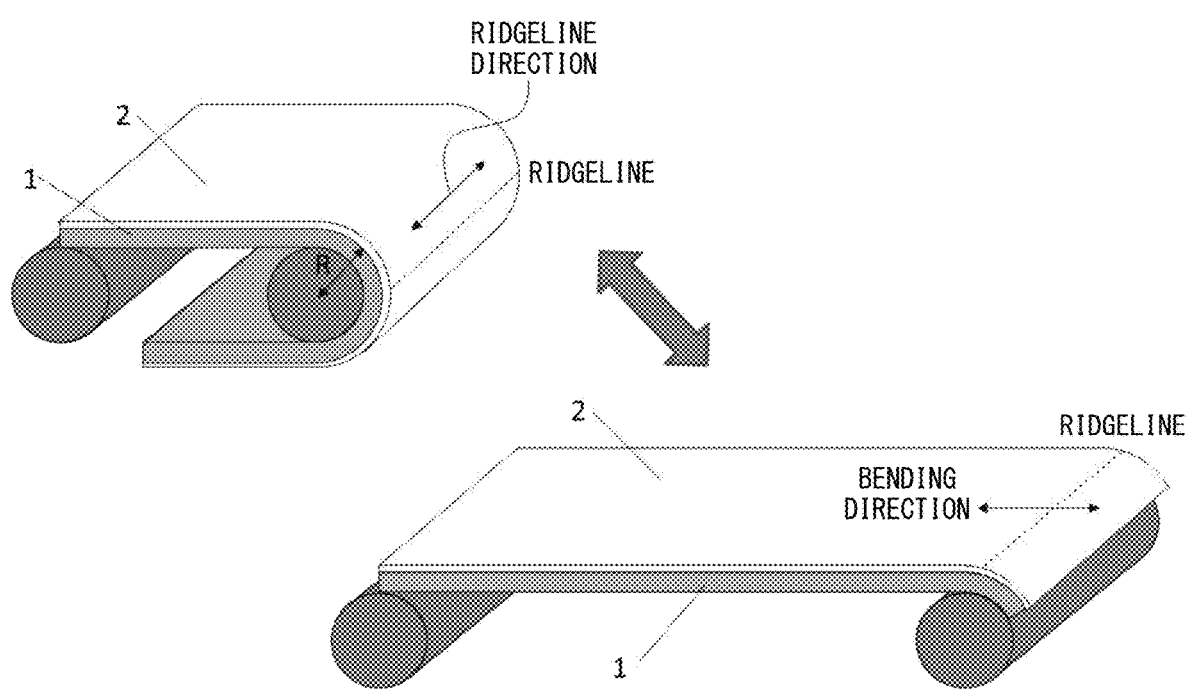
FIG. 2 is a view showing one example of a mode of use of a rollable display.
Figure 3:
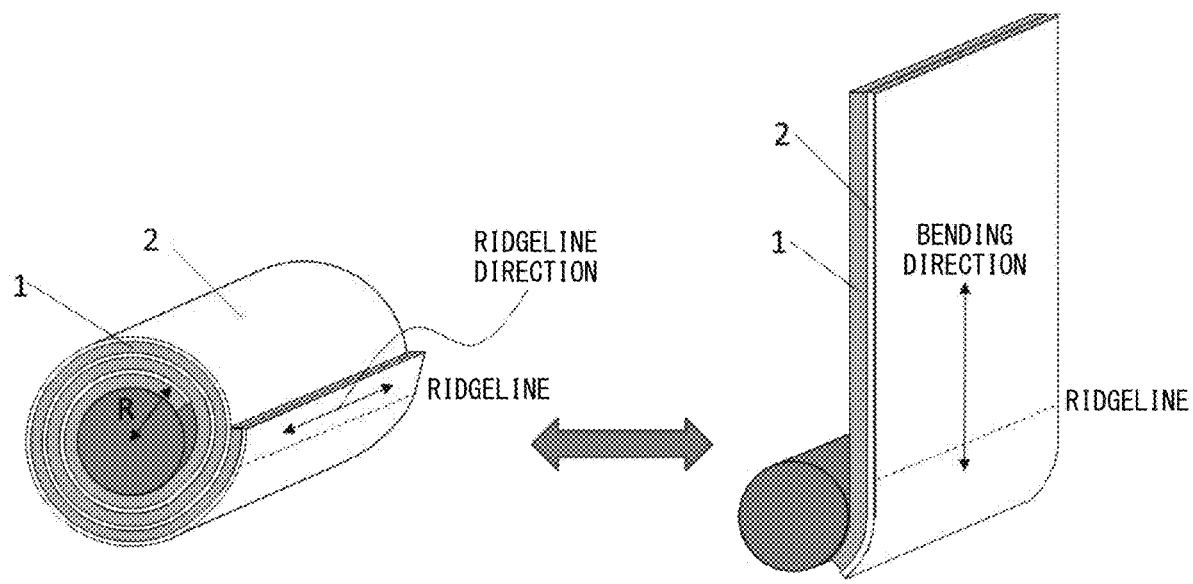
FIG. 3 is a view showing one example of a mode of use of a rollable display.

Examples of the mode of use of the stainless steel foil of the invention are shown in FIG. 1 to FIG. 3. FIG. 1 is one example of a display panel for a foldable electronic device, and FIG. 2 and FIG. 3 are examples of display panels for rollable electronic devices. These drawings are all simplified ones for explaining the modes of use of the stainless steel foil of the present invention. The stainless steel foil 1 of the present invention is used with for example a light emitting element 2 such as an organic EL display element adhered to it planarly by an adhesive etc.

FIG. 1 is an example in which the light emitting element 2 is adhered to the inner side of the stainless steel foil 1, but the light emitting element may be adhered to the outer side of the stainless steel foil 1 as well. In the case of the mode of FIG. 1, the stainless steel foil is subjected to repeated bending between a completely closed state and a 180° opened state. In this Description, the angle of the repeated bending of the stainless steel foil is called an unfolding angle. The closed state is made the reference (0°) and is referred to as the "folding angle" while the most opened state is referred to as the "opened angle". The minimum value of the folding angle is 0°, and the maximum value of the opened angle is 360°. Accordingly, the range of the unfolding angle is 0° or more and less than 360°. In the case of FIG. 1, the folding angle is 0°, the opened angle is 180°, and the unfolding angle is 180°.

When the flexible stainless steel foil of the present invention is, for example, used for a foldable display, the folding angle, opened angle, and unfolding angle of the stainless steel foil are not necessarily limited, but the stainless steel foil of the present invention is a foil having durability to repeated bending at an unfolding angle of 180°. In applications such as foldable terminals typified by mobile phones, the terminals will often be completely opened from a completely folding state like in FIG. 1 and used in a flat state like that of a smartphone. The degree of bending of the stainless steel foil would be a folding angle of 0°, an opened angle of 180°, and an unfolding angle of 180°. In the case of a laptop terminal, the unfolding angle does not have to be 180°. From the viewpoint of visibility of the display, the ability of deployment up to an opened angle of 135° is sufficient. The flexible stainless steel foil of the present invention can be applied to this.

With the mode of bending such as in FIG. 1, at the bent location, the cross-section of the stainless steel foil 1 is bent to an arc shape defined by a bending radius R. Depending on constraints due to other members and the bending radius, sometimes a complete arc will not result. In the bending radius R defined in the present invention, when bending such as shown in FIG. 1, the radius of the outer circumferential surface when approximating the bending by an arc is deemed R. If making R smaller, the thickness of the electronic device in the folded up state can be made smaller. The stainless steel foil of the present invention is advantageous in this regard.

In the present invention, the line forming the fold line when folding the flat stainless steel foil in two is referred to as the "ridgeline" and the direction of the ridgeline is referred to as the "ridgeline direction". The transverse direction to the ridgeline within the plane of the stainless steel foil when returned to the flat state is referred to as the "bending direction."

In the mode such as in FIG. 1, the bent location receives bending strain at localized locations near the ridgeline. In a rollable display such as in FIG. 2 and FIG. 3, the location receiving the repeated bending extends to an area close to the entirety of the stainless steel foil and changes. The folding angle of the stainless steel foil used in a rollable display such as in FIG. 2 and FIG. 3 is 0°, the opened angle is 180°, and the unfolding angle is 180°.

The maximum radius in the case of use with the display spread open such as in FIG. 2 is constant, but in the case of use wound into a roll such as in FIG. 3, the minimum bending radius of the outer circumferential surface of the stainless steel foil is deemed as R (mm). If the bending radius R can be made smaller, it will be possible to make a slide type rollable display such as in FIG. 2 thinner overall. In the rollup type of rollable display such as in FIG. 3, it is possible to reduce the storage space. The high durability stainless steel foil of the present invention is extremely advantageous for rollable displays.

The present invention is a flexible stainless steel foil comprising rolled stainless steel foil with a thickness of 0.1 mm or less which has a tensile strength of 1,800 MPa or more in at least one of a rolling direction or a transverse direction to the rolling direction and a maximum height roughness Rz of 0.35 μm or less obtained from a roughness curve of the stainless steel foil surface measured in the same direction as a tensile direction.

Furthermore, preferably it is a flexible stainless steel foil wherein the thickness is 0.05 mm or less, a ratio of a maximum valley depth Rv to the Rz (Rv/Rz) is 0.6 or less, and an elongation at break at the time of measurement of the tensile strength is 1% or more and 2% or less.

More preferably, it is a flexible stainless steel foil wherein, in addition to the above, wherein, when repeatedly bent 180° at a value satisfying R/t=100 (where R is bending radius (mm) and "t" (mm) is thickness) in the same direction as the tensile direction and then back to 0°, a number of repeated bending operations until a crack with a length of 5 mm or more is formed on a surface of the stainless steel foil is 100,000 or more, and bending habit is at an opening angle of 170° or more.

R/t prescribed for a preferable stainless steel foil of the present invention is an indicator representing the severity of bending considering the stress and strain received by the material. Even with the same R, if the thickness ("t") of the material becomes greater, the stress and strain locally received by the material will become greater. On the other hand, a material requires strength and rigidity commensurate with its application. R/t=100 used as an indicator in the stainless steel foil of the present invention has not been seen much at all up until now in modes of application of metal foil where durability to repeated bending at an unfolding angle of 180° is considered necessary.

(Stainless Steel Foil)

In the present invention, the constituents of the stainless steel foil are not limited, but stainless steel foil used mainly with an electronic device is covered, so one that comprises iron (Fe) which has good corrosion resistance as a primary constituent, specifically in 50 mass % or more, and chrome (Cr) in 10.5 mass % or more may be mentioned. Hereinafter, in the present invention, unless otherwise noted, the notation for the constituent values of the stainless steel foil will be mass %.

The stainless steel foil of the present invention must realize extremely high strength. There are not many such types among materials currently being used commercially. For example, stainless steel foils comprising constituents including C: 0.15% or less, Si: 1.00% or less, Mn: 2.00% or less, P: 0.045% or less, S: 0.030% or less, Ni: 6.00 to 8.00%, Cr: 16.00 to 18.00%, and N: 0.20% or less may be mentioned. Furthermore, austenitic stainless steel foils comprising elements including C: 0.07 to 0.10%, Si: 0.75% or less, P: 0.030% or less, S: 0.030% or less, N: 0.25 to 0.40%, Ni: 5.50 to 7.00%, Cr: 17.50 to 20.00%, and Mn: 9.0 to 12.0% may be mentioned.

The former stainless steel foils are called SUS301 or SUS301L in the JIS standards and are also sometimes used as spring materials. It was learned that it was possible to produce the stainless steel foil of the present invention by carefully improving the production method so as to satisfying the strength and roughness requirements of the same. The latter stainless steel foils are commercial products from Nippon Steel Stainless Steel Corporation called NSSC130S. It was learned that it was possible to satisfy the strength and roughness requirements of the stainless steel foil of the present invention by producing it while carefully improving the production method. Such material is non-magnetic and useful in applications where magnetic properties are not desired.

The microstructure of the stainless steel foil of the present invention is not particularly limited, but austenitic stainless steel with well formed martensite structures is favorable. Some austenitic stainless steels form a stress-induced or strain-induced martensite phase when worked. The stainless steel foil of the present invention preferably has a microstructure with well formed high strength martensite induced by work for ensuring strength.

It is further preferable that the martensite structures occupy an area ratio of 50% or more, more preferably 60% or more. By forming a mixed phase microstructure with the austenite phase, a durability to bending in the range prescribed for the stainless steel foil of the present invention can be achieved.

For measurement of the area ratio of the martensite structures, an EBSD (electron backscatter diffraction) unit set on an FE-SEM (field emission scanning electron microscope) is used to evaluate structures at a polished surface of foil transverse to the thickness direction of the foil. For foils that undergo martensite transformation during work such as the SUS301 foil, the surface is smoothened by chemical polishing in order to prevent martensite transformation from mechanical polishing. The measurement conditions are a magnification of 1500×, a measurement area of 60×120 μm, and measurement intervals of 0.08 μm. The measurement is performed changing the locations for three fields. The average value of the same is taken. In EBSD, the crystal structure and orientation at each measurement point can be judged from the diffracted beam at that measurement point. The ratio of the martensite phase is found by finding the area ratio using the ratio of the phase judged to be martensite phase at the measurement points. In the case of SUS301 or SUS301L, a phase having a body-centered cubic (bcc) structure may be considered to be a martensite phase. The ratio of the number of points to the total of the crystal structures is deemed the martensite phase area ratio.

A microstructure with a coexisting austenite phase and martensite phase can be obtained by, for example, hard rolling metastable austenitic stainless steel such as SUS304, SUS301, etc. and causing a phase transformation from austenite to work-induced martensite. In particular, stainless steel foil produced in this manner is constituted by a high strength martensite phase and an austenite phase obtained by accumulated strain and is thus preferable as the stainless steel foil of the present invention. In particular, stainless steel foil comprising constituents including C: 0.15% or less, Si: 1.00% or less, Mn: 2.00% or less, P: 0.045% or less, S: 0.030% or less, Ni: 6.00 to 8.00%, Cr: 16.00 to 18.00%, and N: 0.20% or less is suitable as the raw material of the stainless steel foil of the present invention.

SUS301 and SUS301L are materials having the above constituents and a balance of iron and unavoidable impurities. SUS301L is a material in which instead of reducing the constituent value of carbon to 0.03%, nitrogen is intentionally added in the range of 0.2% or less. SUS301L is easier to increase in strength. The material would be even more desirable if able to produce it so that the roughness becomes the range prescribed in the present invention. As materials derived from these JIS grade steels, materials having Nb added are high in fatigue strength. The materials would be particularly desirable if able to produce them so that the strength and maximum height roughness Rz become the ranges prescribed in the present invention.

The preferable stainless steel foil of the present invention can be formed with an austenite phase and martensite phase by controlling the total reduction ratio, the rolling speed, etc. The details of the production conditions will be explained later.

Work-induced transformation is utilized to form the phase structure of the stainless steel foil of the present invention. If making the area ratio of the martensite phase 50% or more, preferably 60% or more, the crystal grains will become lamellar structures long in the rolling direction and short in the foil thickness direction. If viewing the structures in the foil surface from the foil thickness direction, the microstructure becomes one which the austenite phase is distribute in islands. Formation of such a multi-phase microstructure will impede the progression of cracks. Due to this, the bending durability is improved.

The stainless steel foil of the present invention can be used with repeated bending under the condition of a bending radius R of 1 mm or more and 10 mm or less. The foil thickness "t" (mm) used under this condition is 0.1 mm or less. The foil thickness t (mm) used under these conditions is 0.1 mm or less, with R/t between 30 or more and 120 or less and is intended for use in applications where the foil is repeatedly bent at an unfolding angle of 135° or more.

If used in applications in which R/t is less than 30, bending habit will form and it will be difficult to satisfy the necessary rupture life. Furthermore, if used in applications in which R/t is larger than 120, it is possible for even conventional stainless steel foil which does not satisfy the requirements of the tensile strength and maximum height roughness (Rz) of the foil of the present invention to satisfy the bending habit resistance and rupture life. Hereinafter, in the present description, when not necessary to differentiate between foldable devices and rollable devices, these devices will be collectively called "foldable devices". The lower limit value of the thickness "t" of the stainless steel foil used in foldable devices is not particularly limited, but generally it is set to 0.02 mm or higher for the purpose of reinforcing the light emitting element.

The number of bending tests endured demanded of foldable devices, while depending on the application of the device, has to be at least 100,000. Cracks introduced on the surface of the stainless steel foil when a repeated bending test is performed for 100,000 cycles at R/t=100 and an unfolding angle of 180° being 5 mm or less is made the benchmark sought for the preferable stainless steel foil of the present invention.

The flexible stainless steel foil of the present invention can be bonded with a flexible light emitting display element such as an organic EL display element used in a foldable device and utilized as an integral unit with it. Large deformation will occur locally if there are cracks on the surface of the bent part of the stainless steel foil causing problems in the display of the light emitting display element and in some cases rupture. Accordingly, it is desirable that cracks are not formed but cracks up to a maximum of 5 mm may be permitted due to the cushioning action provided by the adhesive layer between the light emitting display element and stainless steel foil.

It is foreseen that foldable devices will become smaller, thinner, and lighter in the future. It is desirable for the stainless steel foil of the present invention to be configured such that cracks introduced on the surface of the stainless steel foil when a repeated bending test is performed for 100,000 cycles at R/t=75 and a unfolding angle of 180° will be 5 mm or less, further desirable that cracks introduced on the surface of the stainless steel foil when a repeated bending test is performed for 100,000 cycles at R/t=67 and a unfolding angle of 180° will be 5 mm or less, and even more desirable that cracks introduced on the surface of the stainless steel foil when a repeated bending test is performed for 100,000 cycles at R/t=50 and a unfolding angle of 180° will be 5 mm or less.

Furthermore, permanent deformation (bending habit) resulting from repeated bending is also necessary as an indicator of durability. If the bending habit formed in the bending direction at the time of repeated bending is small, it will not become a problem as it will be corrected by the hinge and frame forming the electronic device, but if the bending habit becomes larger, it will cause inconveniences such as distortions in the display of the display screen. If considering the application as reinforcement of a foldable display, the allowable range of bending habit demanded from the stainless steel foil of the present invention is determined as follows: A repeated bending test of 100,000 cycles at an unfolding angle of 180° or more is performed. Then, while forces such as gravity are kept from being applied in the bending direction of the stainless steel foil, the opened angle arising due to plastic deformation along the bent ridgeline of the stainless steel foil is measured. When this is made a free opened angle, the angle is preferably 170° or more. It is desirably 175° or more. An angle of 180° where no bending habit is formed at all is even more desirable.

The bending habit is measured by setting the stainless steel foil on a flat table so that the bent ridgeline becomes perpendicular to the flat surface of the tabletop, capturing an image focused on the upper end from directly above with a digital camera, and measuring the angle with respect to the stainless steel foil using the image.

Figure 4:
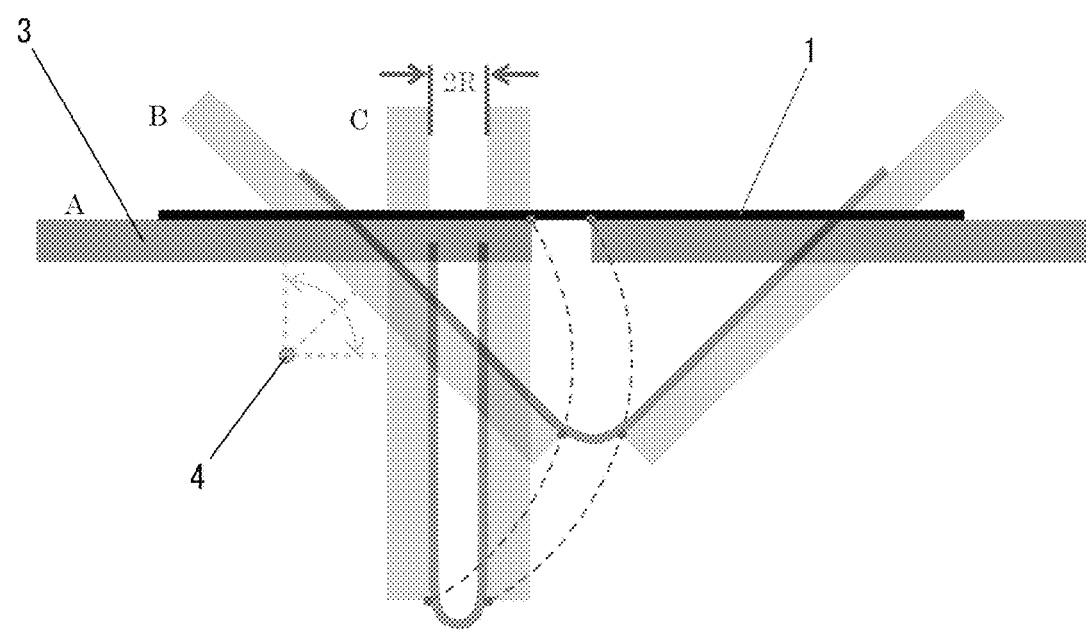
FIG. 4 is a view showing a clamshell type repeated bend testing machine and its operation.

The repeated bending test on the stainless steel foil uses a clamshell repeated bend testing machine and is performed under the conditions of a folding angle of 0° and opened angle of 180°. FIG. 4 schematically shows the bending motions of the repeated bending testing machine. The clamshell repeated testing machine is provided with one set of two retaining plates 3. The stainless steel foil 1 is adhered to this and the retaining plates are inclined to apply a forced bending displacement to the stainless steel foil 1. FIG. 4 shows a state A of an opened angle of 180°, a state B of an approximately 90°, and a state C of a folding angle 0°. One of the two retaining plates is rotated about a drive shaft 4 while inclining it, while the other of the retaining plates is kept at the same angle. Further, the points of contact of the two retaining plates contacting the stainless steel foil move together so that they remain parallel while not changing in distance as shown by the dotted lines in FIG. 4. Through this motion, the stainless steel foil can be repeatedly bent without being acted on by a load other than from the bending. As a commercially available evaluation device that performs this motion, a tension-free clamshell bending tester model DR11MR produced by Yuasa System Co., Ltd. may be mentioned.

When the distance between the two retaining plates when the plates are closed is defined as 2R, the stainless steel foil receives a bending displacement forming an arc with a bending radius R. Depending on the thickness and mechanical properties of the stainless steel foil, sometimes the bent location will not form a perfect arc, but the R in the present invention is the radius of the outer circumferential surface of the stainless steel foil when the bent part determined by the gap 2R in the state of the folding angle of 0° at the time of repeated bending testing is deemed an arc.

In the repeated bending test, the stainless steel foil is cut to a size of 40 mm width by 150 mm length. Measurement is performed so that at the middle of the long sides, the width direction becomes the bending ridgeline direction. The width and length of the stainless steel foil are read and measured up to $1/10^{th}$ of the smallest scale division on a scale with the smallest scale division of 1 mm. The foil is cut to a range of tolerance of ±0.5 mm. The thickness is measured at 10 points at different locations on a sample using a one-ball micrometer which is flat on one side and has spherical on the other with a precision in which the smallest reading value is in micrometers or smaller. The average of these up to 0.1 µm precision is taken. The length of the gap is set to a precision of 0.1 mm or less to obtain within ±3% of the known R/t. Furthermore, before the stainless steel foil is attached to the retaining plates, the two end portions of each bending ridgeline are polished using #1,500 or higher emery paper so that cracks do not form from the end parts of the stainless steel foil. The frequency of the repeated bending determining the bending speed is made 1 Hz.

The stainless steel foil of the present invention has to have a strength of 1,800 MPa or more in the bending direction. This is a necessary condition from the viewpoint of both bending habit and rupture due to repeated bending. In particular, it is essential for suppressing bending habit. If the Young's modulus of the stainless steel foil is substantially the same, the presence or absence of bending habit directly defined by the yield strength, but in the case of the stainless steel foil of the present invention, the yield strength will often be unclear and this is defined by the maximum strength. The strength of the stainless steel foil is 1,800 MPa or more, and more desirably 2,000 MPa or more. If the strength is less than 1,800 MPa, large bending habit will occur under the conditions prescribed by the stainless steel foil of the present invention, so this is not preferable.

The measurement of the strength of the stainless steel foil of the present invention uses a sample cut out in a shape based on JIS 13 Type-B provided with a 150 mm length. The test employs a method based on JIS 2241 "Metallic Materials-Tensile Testing Method" and is performed at a crosshead speed of 50 mm/min while reading the load acting on the load cell. The value of the maximum load at break divided by the cross-sectional area of the sample is deemed the strength. Furthermore, when measuring the elongation value, the measurement is performed with an extensometer.

If there are differences in tensile strength in the plane of the stainless steel foil in the cutting direction, the maximum value should be 1,800 MPa or more. When used as stainless steel foil for a foldable device, the foil is used using the direction in which the tensile strength is 1,800 MPa or more as the bending direction.

The flexible stainless steel foil of the present invention is used as a reinforcing material for a light, a display, or another light emitting device including a light emitting element bonded to a foil surface and able to be folded (bent) in two or wound in a roll. These devices are not only formed with curved surfaces but are also subjected to repeated bending by small curvatures. In particular, organic EL display elements, one type of light emitting electronic elements, are elements capable of high color reproduction and high resolution and are used for high-end TVs and portable phone displays. Bending habit or cracking of the reinforcing materials and peeling of the reinforcing materials and adhesive will degrade the quality of the display at those portions, thus high durability is particularly demanded. For that reason, high tensile strength, and low roughness in a specific direction, specifically the bending direction, are necessary. The stainless steel foil of the present invention is not the substrate on which the light emitting electronic element is directly formed, thus does not have to be smooth as a surface. However, the roughness measured in the bending direction has a large impact on the bending durability.

Here, the important requirement in the present invention is the achievement of both strength and roughness. The measurement direction of the roughness has to match the measurement direction of strength in a tensile test. Strength and roughness in the same measurement direction are coupled requirements. The roughness along the plane of a rolled stainless steel foil will ordinarily differ depending on the measurement direction. The stainless steel foil of the present invention has to satisfy the strength and roughness prescribed in one of the in-plane directions. In the case of usage as stainless steel foil for a foldable device, the direction satisfying the prescribed value of the present invention is used as the bending direction. Below, the prescribed value of roughness with respect to the bending direction will be explained.

In the extreme repeated bending conditions envisaged for the stainless steel foil of the present invention, the maximum height roughness Rz of the surface of the stainless steel foil measured in the bending direction has to be 0.35 µm or less, preferably 0.30 µm or less, more preferably 0.25 µm or less, and ideally 0.20 µm or less. If there are no oxides or other inclusions that would become starting points of fracture in the vicinity of the surface of the stainless steel foil, cracks will often appear from the valley parts of the surface unevenness as seen in a cross-section taken perpendicular to the foil plane and parallel to the bending direction. This is because, at the time of bending, the maximum stress (principal bending stress) is produced in the bending direction of the surface of the stainless steel foil forming the bending radius R. If there is a valley part in the roughness curve of the surface of the stainless steel foil when measured in the same direction as the principal bending stress direction, stress will concentrate at this location. Furthermore, when once introduced fine cracks progress in a transverse direction to the principal stress direction over repeated bending, if the valley parts are connected in that direction, the cracks will progress along those valley parts. Under the repeated bending conditions envisaged for the stainless steel foil of the present invention, cracks will tend to particularly progress more readily if the Rz found from the roughness curve measured in the same direction as the bending direction is 0.35 µm or more and will easily reach a length of 5 mm.

As representative indicators of roughness, there are the maximum height roughness Rz, and arithmetic mean roughness Ra defined in JIS B0601 (2001). There is some degree of correlation between the maximum height roughness Rz and Ra, but durability under the repeated bending conditions of the stainless steel foil of the present invention is strongly correlated with the maximum height roughness Rz. Furthermore, repeated bending durability is strongly dependent on the Rz in the bending direction in particular. The correlation with the Rz in other directions is low. Roughness in other than the bending direction will result in peeling at the bent region if the bonding strength of the adhesive to the light emitting electronic element is weak. This will cause problems or damage to the display from the light emitting electronic element. Therefore, there may be a certain degree of roughness. In particular, two-dimensional unevenness in a transverse direction to the bending direction has little impact on the progression of cracks advancing in the ridgeline direction forming the fold line in the foil and has little impact on the bending durability of the stainless steel foil itself, but it does have a positive effect on the durability of a light emitting panel against adhesive peeling by increasing the area of contact with the adhesive.

In the stainless steel foil of the present invention, roughness in one direction perpendicular to the ridgeline is important from the viewpoint of bending durability. The lower limit of Rz is not particularly set, but an Rz of 0.05 µm or more is desirable with respect to feasibility from an industrial viewpoint and with respect to ensuring the bonding strength of the adhesive. This is because reducing the Rz in the bending direction to this level will also reduce it in the other directions and make it difficult to secure the bonding strength of the adhesive through the anchoring effect. That is, this is not to say that the stainless steel foil of the present invention should have good strength and smoothness in all directions of the stainless steel foil. Rather, it is sufficient that there be a direction in the plane of the stainless steel foil in which the Rz on the surface of the stainless steel foil is 0.35 µm or less and the tensile strength in the same direction as the direction in which the Rz is measured is 1,800 MPa or more. Based on this thinking, the stainless steel foil of the present invention is realistically producible as an industrial material.

The measurement of Rz on the stainless steel foil of the present invention employs a value measured by the contact stylus method in accordance with JISB0601 (2001). The measurement conditions are a measurement length of 1.25 mm, a cutoff ($\lambda c$) of 0.25 mm, a cutoff ($\lambda s$) of 0.0025 mm, a contact probe scanning speed of 0.3 mm/sec, and a measurement load of 0.7 mN. The probe used is a cone with a radius of 2 µmR and a tip angle of 60°. Note that five or more points at different locations on each surface of the stainless steel foil are measured, and the average is taken. Furthermore, if there is a large difference in roughness between the two sides of the stainless steel foil, the measured roughness for the worse side is employed.

Further preferable in the present invention is a stainless steel foil in which the thickness is 0.05 mm or less, the ratio of the maximum valley depth Rv to the Rz (Rv/Rz) is 0.6 or less, and the elongation at break at the time of measurement of the tensile strength is 1% or more and 2% or less. The stainless steel foil of the present invention is particularly suitable for applications subjected to repeated bending at a large curvature and an R of 5 mm or less and is particularly effective when it is necessary for the foil thickness to be reduced to a thickness of 0.05 mm or less. Furthermore, considering the yield of the material, it is preferable that the foil be cut so that the rolling direction is the bending direction. The smaller the thickness of the foil, the greater the impact on the Rz. In the case of a high strength foil such as the present invention, what will particularly impact the Rz in the rolling direction are oil marks. "Oil marks" are marks made when oil is discharged at the time of rolling in a transverse direction to the rolling direction, thus forming recessed parts. Therefore, there is a tendency for the maximum valley depth Rv of the Rz of the maximum height roughness to become larger in the rolling direction, but the size of the Rv is sensitive to bending durability. It is desirable for Rv/Rz to be made 0.6 or less while securing the strength.

Furthermore, in regions of low cycle fatigue becoming an issue in the present invention, a high elongation at break is generally considered desirable, but the stainless steel foil of the present invention preferably has an elongation at break in the range of 1 to 2% when a tensile test is performed in the rolling direction. Generally, stainless steel foil with a large elongation at break has low strength, but even among high strength stainless steel foils satisfying the strength prescribed in the present invention, there are those with an elongation at break of more than 2%. The yield point is clear in such a stainless steel foil. Application of an equivalent strain or more will result in large plastic deformation and large bending habit. There is no problem if the yield strength is sufficiently high with respect to the curvature of the bending, but the stainless steel foil of the present invention is envisaged for applications subjected to repeated bending and stretching under conditions of curvature relative to the foil thickness larger than the past. Moreover, even if the strain estimated from the curvature of the bending is lower than the yield strain in the tensile test, repeated bending of the foldable device is envisaged to exceed it. The display of a foldable device is commonly constituted from a reinforcing metal foil, an organic EL element, and an adhesive bonding these to each other. The rigidity of the element or adhesive, the constituent materials other than the metal foil, is low. The metal foil is used to supplement the rigidity. The bending part of the display can be bent within a free space. A large strain being applied instantaneously by vibration etc. and exceeding the static design strain is also envisaged. For example, stainless steel foil having the above yield point has the risk of large plastic deformation occurring and large bending habit being introduced when strain exceeding the yield strain is applied. Therefore, in the stainless steel foil of the present invention, it was found that a material in which stress greatly increases in relation to strain is preferable, even if the yield point is exceeded, over those of the same strength but a clear yield point and large elongation at break, and that materials with an elongation at break of 2% or less were favorable. However, materials with a ductility of less than 1% were not very favorable.

(Production of Stainless Steel Foil of Present Invention)

In flexible stainless steel foils, achieving both the strength and roughness demanded of the stainless steel foil of the present invention had been difficult in the past. As an effective measure for achieving both the strength and roughness prescribed for the stainless steel foil of the present invention, it is necessary to take into account all of the rolling speed, working roll grit size, number of passes, and tension heat treatment conditions after rolling.

Stainless steel foils for foldable devices often are made approximately square shapes. If cut out from a rolled roll material to obtain the product, in practice if cutting out a material of a square shape from a rolled roll material, from the viewpoint of yield, the foil is cut so that the rolling direction (RD) and transverse direction (TD) thereto form the four sides of the square in the present invention.

As a measure for improving the tensile strength of the foil against bending, using a large total reduction ratio may be mentioned. Furthermore, if applying heat treatment at 300° C. or more after rolling, the carbon and nitrogen in the stainless steel foil will be redistributed to defects such as dislocations formed by work strain so as to improve durability and tensile strength, suppress bending habit in repeated bending, and increase the number of bends resulting in a crack length of 5 mm.

On the other hand, when applying strong rolling to improve tensile strength, defects worsening the roughness such as oil marks and transfer of working roll marks will increase.

Oil marks will create valley parts mainly in a transverse direction to the rolling direction, and transfer of grinding marks will give rise to unevenness mainly in the rolling direction. Uneven shapes produced by oil marks and transfer of grinding marks will particularly impact the durability of the stainless steel foil of the present invention. Therefore, it is necessary for these to be suppressed while achieving strength. Satisfying the thickness, strength, and roughness of the stainless steel foil prescribed for the present invention requires exceptional inventiveness, but the provision on roughness of the stainless steel foil of the present invention does not seek two-dimensional roughness. It is sufficient to particularly reduce it in at least a specific direction according to the bending direction. When the rolling direction is made the bending direction, a process mainly focused on reducing oil marks may be adopted.

Furthermore, when desiring to make a transverse direction to the rolling direction the bending direction, a measure for reducing transfer of grinding marks may be adopted. To suppress oil marks, the thickness of the oil film in the roll bite may be reduced by reducing the rolling speed or improving the reduction ratio per path. To suppress unevenness in a transverse direction to the rolling direction, a working roll with a higher grit size and lower working roll roughness (arithmetic mean roughness Ra) may be used. A grinding step may be added and a working roll with even smaller roughness can be used. Furthermore, a working roll blasted to give a surface with a dimpled structure and be free of grinding marks can also be used. When producing a stainless steel foil with a high strength multi-phase structure in which work-induced martensite has formed like in the present invention, streaks of unevenness parallel to the rolling direction can easily form, making it particularly difficult to achieve both strength and smoothness. However, in the flexible stainless steel foil of the present invention, it is sufficient to improve the roughness (maximum height roughness Rz) in the bending direction. For example, if designing a material so that the rolling direction becomes the bending direction, a countermeasure may be taken to reduce continuous streaks of unevenness in a transverse direction to the rolling direction caused by oil marks. Unevenness in other than the bending direction created from the multi-phase microstructure constituted by a martensite phase and austenite phase can be used to improve the bonding strength of the adhesive and is therefore convenient.

Below, the method for producing the flexible stainless steel foil of the present invention will be explained based on the above production guidelines.

To produce the stainless steel foil of the present invention, it is necessary to control production in the step of rolling the foil to a thickness of 0.4 mm or less.

Foil rolling is generally performed with a multi-roll rolling mill to control the thickness and roughness and stabilize the mechanical properties such as the strength. In particular, a cold-rolling mill with 12 rolls or more is desirable for rolling. To obtain a tensile strength of 1,800 MPa or more, it is necessary for the total reduction ratio to be made 45% or more in the final cold rolling step. Here, the "total reduction ratio" means the reduction rate (%) in the thickness of the steel material before and after the final cold rolling step.

The total reduction ratio is defined by the formula (A) below.

Total reduction ratio (%)=100−(thickness of steel material after final cold rolling step)/(thickness of steel material before final cold rolling step)× 100   (A)

The total reduction ratio is preferably 50% or more, more preferably 55% or more. If the total reduction ratio is less than 45%, it is difficult to achieve a tensile strength of 1,800 MPa or more. The upper limit of the total reduction ratio is not set in particular, but generally the number of passes will increase and result in oil marks deepening if the total reduction ratio is large, so a total reduction ratio of 80% or less is preferable. Furthermore, the number of passes in the final cold rolling step is preferably 4 to 10. If the number of passes increases, this leads to a reduction in work-generated heat and promotes phase transformation to work-induced martensite. As a result, the tensile strength will rise. On the other hand, oil marks will deepen. Conversely, if the number of passes is too small, while there is an effect of suppressing oil marks, sometimes the tensile strength will not be sufficiently obtained. To prevent this, a measure of keeping down the rolling speed is adopted.

Oil marks are also controlled by the average rolling speed in the final cold rolling step. To obtain a smooth surface, the average rolling speed of all passes is preferably 210 m/min or less. It is more preferably 150 m/min or less, and even more preferably 100 m/min or less. If the average rolling speed is too high, entrainment of rolling oil will increase and promote formation of oil marks, whereby sometimes the surface roughness when measured in the rolling direction will increase.

The surface roughness of the steel material in the final cold rolling step, in particular, the roughness in the TD, is also controlled by the roughness transverse to the working roll rolling rotation direction. To obtain a steel material surface roughness Rz of 0.35 μm or less, the working roll roughness Ra transverse to the rolling rotation direction of the working roll is preferably 0.40 μm or less, more preferably 0.30 μm or less, even more preferably 0.10 μm, and ideally 0.08 μm or less. If the working roll roughness is too great, the steel material surface roughness Rz will also increase, and sometimes a sufficient bending durability will not be achieved. The lower limit reduces the time spent in grinding or polishing by the working rolls, so a working roll roughness Ra of 0.01 μm or more is preferable.

The heat treatment step indicates a bright annealing step or low temperature heat treatment step. Bright annealing is performed when cutting back on cold rolling in a later step, whereas low temperature heat treatment is performed after the final cold rolling step. The purpose of the bright annealing step is to soften the material. It is characterized by annealing in a reducing atmosphere including hydrogen such as decomposed ammonia gases to keep an oxide film from forming and to suppress surface marks in cold rolling in the next step. The heat treatment temperature in the bright annealing step is preferably 900 to 1,200° C. If the heat treatment temperature is too low, the softening of the steel material will not progress sufficiently, leading to an increase in the number of cold rolling passes. If the heat treatment temperature is too high, coarse crystal grains will form and sometimes a sufficient durability may not be achieved. The purpose of the low temperature heat treatment step is to strengthen the microstructure by redistribution of carbon and nitrogen to lattice defects as explained above. The heat treatment temperature in the present step is preferably 300 to 800° C. Heat treatment after cold working is not essential, but if the heat treatment temperature is too low, carbon and nitrogen will be less likely to diffuse and strengthening of the microstructure will not sufficiently progress. Furthermore, sometimes the elongation value will become larger than the preferable elongation at break of the present invention. Conversely, if the heat treatment temperature is too high, the martensite phase causing the high strength will disappear and work strain will also be released, so the necessary tensile strength will no longer be achieved.

The flexible stainless steel foil of the present invention is used as a reinforcing material to increase the mechanical strength and durability of a light emitting electronic element of a foldable device having a flexible light emitting electronic element such as a flat organic EL display element bonded to its surface and able to be have its screen folded up or wound into a roll to be stored. Presently, other than a flexible light emitting device including an organic EL display element, no applications for a reinforcing material needing the durability against repeated bending prescribed in the present invention can be found, but if there were a similar application for extreme repeated bending in one direction, the flexible stainless steel foil of the present invention could be used.

EXAMPLES

Below, while showing examples, the flexible stainless steel foil of the present invention will be explained more specifically. Note that the examples shown below are just single illustrations of the flexible stainless steel foil of the present invention. The flexible stainless steel foil of the present invention is not limited to the examples shown below.

Example 1

Stainless steel foil samples with a thickness of 30 to 100 μm were produced and investigated for durability through repeated bending tests. The produced stainless steel foils were ferritic SUS430 (grade 430: Fe—17.0% Cr—0.07% C—0.4% Si—0.6% Mn—0.02% P—0.001% S), austenitic stainless steel SUS301 (grade 301: Fe—17.0% Cr—6.5% Ni—0.12% C—0.06% N—0.5% Si—0.6% Mn—0.03% P—0.0008% S), and austenitic NSSC130S (grade 130S: Fe—17.7% Cr—6.5% Ni—11.6% Mn—0.09% C—0.31% N—0.48% Si—0.022% P).

Stainless steel foil samples were produced in the following way. Ferritic and austenitic stainless steel foils with a thickness of 300 to 400 μm were purchased. The austenitic stainless steel foil was subjected to a cold rolling step and a bright annealing step once or repeated twice.

The bright annealing step was designed for softening the material and performed annealing at a temperature of 900° C. to 1,200° C. in a reducing atmosphere including hydrogen such as decomposed ammonia gases.

In the final cold rolling step, the thickness was 30 to 100 μm. After that, a cleaning step, and a low temperature heat treatment (TA) step were performed to produce samples for evaluation.

Rolling was performed with a 12-roll reverse cold rolling mill. The total reduction ratio in the cold rolling step was 50% to 87%, and the number of passes was 5 to 15. The average rolling speed of all passes was 50 to 300 m/min. Working rolls were prepared in three levels, from working rolls controlled to a roughness Ra transverse to the rolling rotation direction of 0.08 or less, three working rolls controlled to 0.2 μm or more and less than 0.3 μm.

After final cold rolling, low temperature heat treatment (TA) was performed. This step comprised applying tension in the length direction of the stainless steel foil while continuously performing annealing and is thus abbreviated as "TA". The heat treatment temperature in the TA step was 350 to 900° C. Samples finished without the low temperature heat treatment were also evaluated.

Stainless steel foils produced in the above manner were subjected to tensile tests, surface roughness measurements, and repeated bending tests, in various directions. Furthermore, the SUS301 foil microstructure was evaluated by EBSD (electron backscatter diffraction). In the EBSD evaluation of the SUS301 foil microstructure, the percentage of the stainless steel foil occupied by the martensite phase was found. At the stainless steel foil surface after being chemically polished to remove surface strain, the crystal phases in the samples were identified using an EBSD analysis device set on a FE-SEM (field emission scanning electron microscope). The measurement conditions were a magnification of 1500×, a measurement area of 60×120 μm, and measurement intervals of 0.08 μm. The measurements were performed at different locations at three viewing fields. The FE-SEM was the SU-70 made by Hitachi High-Technologies Corporation, and the EBSD device was the OIM made by TSL Solutions.

The tensile test was performed by cutting out from stainless steel foil produced in the above way a test piece of a shape based on JIS 13 Type-B Test Piece of 150 mm length, attaching a contact strain gauge with distance between sample points of 50 mm, and applying tension at a crosshead speed of 50 mm/min. The test direction was either the rolling direction (RD) or the transverse direction (TD) thereto and was made the same direction as the test direction of the repeated bending test. The load until break was monitored through a load cell. The value of the maximum load divided by the cross-sectional area of the sample before the test was defined as the strength. Furthermore, the value expressed by percent of the ratio of the value of the elongation measured by the contact strain gauge at the time the sample broke to the initially measured length (gauge length) was defined as the elongation at break. The strength and elongation at break were the averages of the measurements for five test pieces.

The roughness measurement was performed by measuring the surface of the stainless steel foil produced in the above way using a contact probe type surface roughness measurement device in the same direction as the tensile direction in the tensile test. The measurement device used was the SURFCOM130A contact probe type surface roughness measurement device made by Tokyo Seimitsu Co., Ltd., and the evaluation was performed according to JIS B0601 (2001). The measurement conditions were a measurement length of 1.25 mm, a cutoff (λc) of 0.25 mm, a cutoff (λs) of 0.0025 mm, a contact probe scanning speed of 0.3 mm/sec, and a measurement load of 0.7 mN. The probe was a cone with a tip radius of 2 μm and a tip angle of 60°

In the roughness measurement, a roughness curve was found from a contour curve comprised of a displacement profile of the probe corresponding to the unevenness on the foil surface measured in one direction. The maximum height roughness (Rz) and maximum valley depth (Rv) were derived as roughness indicators for the stainless steel foil of the present invention. Five arbitrary points at different locations on the stainless steel foil surface were measured. The average of the five points was treated as the measurement value. No significant difference could be found in the roughness between the two sides of the stainless steel foil in the present example, but the worser of the values was treated as the indicator in the present example.

For the sample for the repeated bending test, a sample of a size of a width 40 mm×length 100 mm was cut out from stainless steel foil produced in the above way with longitudinal direction matching either the RD or the TD The repeated bending test used the tension-free clamshell bending tester model DR11MR produced by Yuasa System Co., Ltd. Using the 100 mm length direction of the sample as the bending direction, the motions of closing by bending at the center by 180° and then opening by unbending by 180° are repeated. The curvature of the bending can be changed by adjusting the gap at the time of the closing by bending. As shown in FIG. 4, a bent part with a bending radius R is formed by setting the gap to 2R. The frequency of repeated bending was 1 Hz. The test was performed until 100,000 cycles were reached.

A crack evaluation of "A" was given to samples with no cracks by the time 100,000 cycles of repeated bending concluded, a crack evaluation of "D" to those in which there was even one crack of 5 mm or more, a crack evaluation of "C" to those with a maximum crack length of 3 mm or more and less than 5 mm, and a crack evaluation of "B" to those in which cracks were observed but the maximum crack was less than 3 mm. In particular, there were cases when multiple cracks were found in samples judged to have a crack evaluation of "D" and crack evaluation of "C", but from the intended application of the stainless steel foil of the present invention, the maximum crack length was made the criteria of judgment. Samples with an evaluation of D were considered to be failing and samples of others were considered to be passing. In almost all of the samples judged to have an evaluation of "B" through the evaluations, the crack lengths were less than 1 mm. The cracks grew comparatively quickly if the crack lengths exceeded 1 mm.

For samples which did not completely break at 100,000 cycles, the test piece was detached from the testing jig being careful so that a large force was not applied, and the free opened angle remaining in the stainless steel foil was measured. If the stainless steel foil is laid down, the opened angle will change due to its weight, so the stainless steel foil is set on a flat table so that the bent ridgeline is perpendicular to the flat surface of the tabletop, an image focused on the upper end part from above is captured with a digital camera, and the angle added to the stainless steel foil is measured using the image. If the bending habit was small and the stainless steel foil could not stand by itself, the measurement was performed with plates contacting the stainless steel foil from the two sides so that the bending habit did not occur at the stainless steel foil. Samples in which the stainless steel foil returned to an opened angle of 180° with no bending habit were evaluated as "A", those with an opened angle of 175° or more and less than 180° were evaluated as "B", those 170° or more and less than 175° were evaluated as "C", and those with an opened angle of less than 170°, that is, with a bending habit of 10° or more, were evaluated as "D".

Table 1 shows a summary of the production methods and the evaluation results of the stainless steel foil.

The total reduction ratio (%), arithmetic mean roughness Ra (lam) indicating working roll roughness, number of final rolling step passes (times), rolling speed (m/min), and annealing temperature (TA temperature: (° C.)) after the low temperature heat treatment step, important as production method parameters, are shown.

In Table 1, the tensile test directions and the bending directions in the repeated bending tests performed in the roughness measurement direction are all shown to be same. Cases in which the measurement direction was the rolling direction were indicated as "RD", and those in which the measurement direction was the transverse direction to the thickness direction were indicated as "TD".

Furthermore, in EBSD measurement, the measurement and analysis were performed on the assumption that the sample was constituted by the two phases of an austenite phase having a face-centered cubic structure and a martensite phase having a body-centered cubic structure. The percentage of the total number of measurement points that were judged to be martensite, that is, the area ratio occupied by martensite phase, was presented as M phase ratio (%). The M phase ratio is a value found by rounding off the average of three points at different locations.

In the stainless steel foil of the present invention, properties pertaining to both microcracks and bending habit are also necessary for durability. Cases where either the crack evaluation or bending habit evaluation was given a "D" evaluation were treated as failing.

TABLE 1

| Test sample no. | Stainless steel foil | | Production parameters | | | | | Stainless steel foil properties | | |
|---|---|---|---|---|---|---|---|---|---|---|
| | Steel grade | Thickness (μm) | Total reduction ratio (%) | Working roll roughness Ra (μm) | No. of final rolling passes | Average rolling speed (m/min) | TA temp. (° C.) | Tensile strength (MPa) | Elongation at break (%) | Roughness Rz (μm) |
| 1 | SUS430 | 40.0 | 87 | ≤0.10 | 7 | 300 | 650 | 1050 | 2.5 | 0.241 |
| 2 | 130S | 40.2 | 80 | ≤0.10 | 10 | 200 | 500 | 1850 | 1.9 | 0.343 |
| 3 | SUS301 | 40.3 | 73 | ≤0.10 | 10 | 205 | 350 | 1845 | 1.4 | 0.341 |
| 4 | 130S | 40.2 | 80 | ≤0.10 | 10 | 250 | 650 | 1950 | 2.1 | 0.380 |
| 5 | SUS301 | 40.3 | 73 | ≤0.10 | 10 | 205 | 900 | 1510 | 12.3 | 0.341 |
| 6 | SUS301 | 40.3 | 73 | ≤0.10 | 10 | 205 | 800 | 1805 | 1.8 | 0.338 |
| 7 | SUS301 | 39.9 | 65 | ≤0.10 | 10 | 150 | — | 1833 | 8.7 | 0.312 |
| 8 | SUS301 | 39.9 | 65 | ≤0.10 | 10 | 150 | 350 | 1852 | 1.4 | 0.314 |
| 9 | SUS301 | 40.0 | 73 | ≤0.10 | 8 | 150 | — | 1969 | 1.3 | 0.333 |
| 10 | SUS301 | 40.0 | 73 | ≤0.10 | 10 | 150 | 700 | 1928 | 1.4 | 0.348 |
| 11 | SUS301 | 39.9 | 73 | ≤0.10 | 5 | 150 | 700 | 2032 | 1.2 | 0.298 |
| 12 | SUS301 | 100.0 | 67 | ≤0.10 | 6 | 150 | 650 | 1803 | 1.9 | 0.270 |
| 13 | SUS301 | 99.9 | 67 | 0.20 to 0.30 | 6 | 150 | 650 | 1820 | 2.0 | 0.810 |
| 14 | SUS301 | 99.9 | 70 | ≤0.10 | 6 | 150 | 650 | 1828 | 1.5 | 0.305 |
| 15 | SUS301 | 50.0 | 50 | 0.20 to 0.30 | 5 | 150 | 400 | 1853 | 1.5 | 0.301 |

TABLE 1-continued

| | | | | | | | | | |
|---|---|---|---|---|---|---|---|---|---|
| 16 | SUS301 | 49.9 | 50 | 0.20 to 0.30 | 12 | 150 | 400 | 1821 | 1.2 | 0.392 |
| 17 | SUS301 | 30.1 | 50 | ≤0.10 | 5 | 80 | 650 | 1910 | 1.3 | 0.281 |
| 18 | SUS301 | 29.9 | 50 | ≤0.10 | 5 | 50 | 650 | 2010 | 1.1 | 0.210 |
| 19 | SUS301 | 30.0 | 50 | ≤0.08 | 5 | 50 | 700 | 1955 | 1.2 | 0.188 |

| | Stainless steel foil properties | | | Repeated bending evaluation conditions | | Repeated bending evaluation results | | |
|---|---|---|---|---|---|---|---|---|
| Test sample | Rv/Rz | Measurement direction | M phase ratio (%) | Bending radius R (mm) | R/t | Cracking evaluation | Bending habit evaluation | Remarks |
| 1 | 0.559 | RD | — | 3.95 | 98.8 | C | D | Comp. example |
| 2 | 0.549 | RD | — | 3.95 | 98.3 | B | B | Example |
| 3 | 0.529 | RD | 67 | 3.95 | 98.0 | A | B | Example |
| 4 | 0.602 | RD | — | 3.95 | 98.3 | D | B | Comp. example |
| 5 | 0.552 | RD | 26 | 3.95 | 98.0 | A | D | Comp. example |
| 6 | 0.548 | RD | 64 | 3.95 | 98.0 | B | C | Example |
| 7 | 0.518 | RD | 51 | 3.95 | 99.0 | B | C | Example |
| 8 | 0.529 | RD | 67 | 3.95 | 99.0 | B | B | Example |
| 9 | 0.522 | RD | 69 | 3.95 | 98.8 | B | A | Example |
| 10 | 0.569 | RD | 62 | 3.95 | 98.8 | C | B | Example |
| 11 | 0.504 | RD | 72 | 3.95 | 99.0 | A | A | Example |
| 12 | 0.512 | TD | 60 | 10.0 | 100.0 | B | C | Example |
| 13 | 0.426 | TD | 60 | 10.0 | 100.1 | D | C | Comp. example. |
| 14 | 0.525 | RD | 66 | 10.0 | 100.1 | A | B | Example |
| 15 | 0.535 | RD | 64 | 5.00 | 100.0 | B | B | Example |
| 16 | 0.606 | RD | 62 | 5.00 | 100.2 | D | C | Comp. example |
| 17 | 0.532 | RD | 65 | 2.25 | 74.8 | B | A | Example |
| 18 | 0.512 | RD | 67 | 2.05 | 68.6 | A | B | Example |
| 19 | 0.524 | RD | 68 | 1.50 | 50.0 | B | B | Example |

Sample Nos. 1 to 11 are stainless steel foils with a thickness of 40 μm. Steel Material 430 of Sample No. 1 is a ferritic stainless steel and relatively cheap. While it was easy to smoothen the surface, the strength did not increase even if the total reduction ratio was raised in comparison to other stainless steel foils. Steel Material 130S and Steel Material 301 are austenitic stainless steels. Steel Material 130S is a primarily austenite phase stainless steel foil. It was found through X-ray diffraction and electron backscatter diffraction that Steel Material 301 had a multi-phase microstructure of an austenite phase containing a large amount of martensite. This is because the austenite phase undergoes a martensite transformation due to extreme cold working. These stainless steel foils were subjected to a repeated bending test at a bending radius of 4.0 mm.

The stainless steel foils of Sample No. 2, Sample No. 3, and Sample Nos. 6 to 11, which have a tensile strength and maximum roughness Rz satisfying the material conditions of the present invention, are the stainless steel foil of the present invention which has superior durability in usage with a foldable device. On the other hand, in the sample of Sample No. 1, which had a smaller, superior Rz to that of Sample No. 2 and Sample No. 3, there were extended cracking and also large bending habit, making it inferior in bending durability. The criteria of the present invention were not satisfied. This is because Steel Material 430, which is constituted primarily by a ferrite phase, while being easy to finish to a smooth surface, could not be given sufficient strength. Steel Material 130S and Steel Material 301 can be provided with strength, but unlike Steel Material 430, these materials cannot be given a low Rz unless the rolling speed is greatly lowered. It is by reducing the rolling speed and using smooth rolls with an appropriate number of passes that a stainless steel foil with high durability such as Sample No. 2, Sample No. 3, and Sample Nos. 6 to 11 can be achieved.

Sample No. 2 is austenitic stainless steel and is characterized by being non-magnetic. Accordingly, it is useful as a reinforcing stainless steel foil for a foldable device demanding non-magnetic properties. Regarding the bending habit, little permanent deformation (bending habit) on the ridgeline was found. On the other hand, even if the same steel grade, Sample No. 4 was high in strength, but despite this had cracks appearing with fewer bends than in Sample No. 2. This is because the roughness in the bending direction was large. The roughness on the working rolls used in the final rolling was the same, but the rolling speeds were high, so the oil marks became larger. As a result, the Rz in the rolling direction in particular became greater. Furthermore, the maximum valley depth Rv also became greater. If Sample No. 4 is subjected to a repeated bending test with a bending radius of 5 mm under the same conditions, the crack evaluation result will be "B". Under conditions in which R/t exceeds 125, a durability of 100,000 cycles can be achieved even without paying much attention to the production method. When repeated bending is performed with an extreme curvature of bending, the impact of Rz and Rv/Rz at levels which had not been a problem in sheets will be strongly prominent particularly in thin foils.

The impacts of Rz and Rv/Rz on repeated bending durability are similar for the Steel Material 301 of different steel grade. Furthermore, in Steel Material 301 foil, there is also an impact of the microstructure due to the differences in production conditions. In the Steel Material 301, Sample No. 5 had no cracks at all, but the bending habit became significantly greater. This is because the TA temperature was too high resulting in softening and a drop in strength. Due to this, due to the bending strain under the bending conditions in the test, the yield point was exceeded, and large plastic deformation occurred.

Sample No. 5 and Sample No. 6 had high ductility like Sample No. 1. It had been thought that at regions of low cycle fatigue such as in the present test conditions, the durability would be better the greater the elongation at break, but it was found by the testing performed this time that in the stainless steel foil of the present invention, the elongation at break was preferably 2% or less. The materials in Sample No. 5 and Sample No. 6 also had a low martensite phase (M phase) percentage in the samples. This is because in these materials, the TA temperature after rolling was raised. Due to this, they transformed to the equilibrium phase of the austenite phase.

The ratio of the martensite phase in 301 steel material foil, which has superior ductility in the present examples as typified by Sample No. 3, is 60% or more. From the results of EBSD analysis, the marten microstructure seen from the foil surface appears to have islands of austenite phase distribute in the martensite phase. The size of the islands of the austenite phase was 20 µm or less in the TD, but had a long elongated shape in the RD. Such a microstructure increased strength and yield strength and further impeded the progression of extremely fine fatigue cracks caused by repeated bending.

There were differences in durability as a reinforcing stainless steel foil for a foldable device among Sample Nos. 7 to 11 which satisfy the requirements of the present invention.

The cold rolling conditions for Sample No. 7 and Sample No. 8 were the same, but Sample No. 7 was finished without low temperature heat treatment (TA) being performed after cold rolling, whereas Sample No. 8 was finished with heat treatment with a TA temperature of 350° C. No large difference in strength and roughness was observed, but the ratio of the martensite phase was lower in Sample No. 7. This is thought to be because the total reduction ratio was lower but performing TA at 350° C. raised the ratio of the martensite phase. As a result, while the difference in strength was not large, there was a great difference in the stress-strain curve obtained in the tensile test. In Sample No. 7, a clear yielding was shown and the elongation at break became large, while in Sample No. 8, a clear yielding was no longer shown and the elongation at break became small. The strain indicative of yielding was lower than the strain estimated from the thickness and curvature of the stainless steel foil in the present test, but it is thought that in a more dynamic repeated bending test, due to the stainless steel foil not being constrained near the bending ridgeline, strain would increase locally due to the vibration, localized yielding would occur, and due to this the plastic deformation would become greater and the durability would fall. In the foldable device envisaged by the present invention, the rigidity of the organic EL element is envisioned as being small compared with the stainless steel foil resulting in the same situation. Even among stainless steel foils having the same level of high strength, it was found that a sample such as Sample No. 8 in which a worked martensite microstructure formed, the elongation at break was low, and the yield point was not clear was preferable contrary to the metallurgical thinking of a high elongation at break being desirable with low cycle fatigue, Sample No. 9, like Sample No. 7, is SUS301 finished without low temperature heat treatment (TA) after cold rolling, but by increasing the total reduction ratio, it was possible to increase the martensite ratio even without performing low temperature heat treatment. The result become stainless steel foil of a comparatively high bending durability.

Sample No. 10 and Sample No. 11 produced results demonstrating that there was a difference in durability when the cold rolling pass schedule differs. Sample 10 and Sample No. 11 had a different number of passes in final cold working. Sample No. 10 was subjected to a larger number of passes, so the oil marks became larger and the Rz, particularly the Rv, increased. As a result, the bending sensitivity in the RD increased and the frequency of cracking in particular in the bending durability and the speed of progression increased. On the other hand, Sample No. 11 had a small number of passes. As a result, stainless steel foil which was strong and had a smooth surface was obtained. As a result, the durability under the bending conditions demanded of a foldable device increased. A further reduction in the number of passes was attempted, but breakage during rolling increased.

Sample No. 12, Sample No. 13, and Sample No. 14 were Steel Material 301 foils with a thickness of approximately 100 µm. It was found through X-ray diffraction and EBSD (electron backscatter diffraction) that multi-phase microstructures of an austenite phase containing a martensite phase similar to Sample No. 3 were created. The ratios of the martensite phase were smaller than Sample No. 3. Under the rolling conditions through which Sample No. 12 and Sample No. 13 were prepared, a strength of 1,800 MPa or more was found only in the transverse direction to the rolling direction. Sample No. 12 and Sample No. 13 differed in roughness (Ra) of the rolling rolls. The roughness of the rolls impacted the roughness particularly in the transverse direction to the rolling direction. As a result, the durability in the transverse direction to the rolling direction greatly differed. Despite Sample No. 13 having a higher strength than Sample No. 12, the Rz was larger than the criteria value, so cracks progressed in Sample No. 13 making it inferior in durability.

Sample No. 12 is the stainless steel foil of the present invention which does not satisfy the strength criteria in the RD and other directions besides the TD but does satisfy the strength and roughness conditions in the TD and is durable against 100,000 cycles of repeated bending in the TD. On the other hand, the foil in Sample No. 13 which employed a larger roll roughness had a large surface roughness in the TD and did not satisfy the stipulations of the present invention. As a result, the rupture life dropped.

Sample No. 14 is a foil which was raised in total reduction ratio and as a result also has a strength in the RD satisfying the present invention. A material with a large elongation at break is obtained which is easy to be increased in strength in the case of the latter direction between the rolling direction (RD) and the in-plane transverse direction (TD) in comparison to Sample No. 12, but by raising the total reduction ratio, a strength equivalent to the strength in the TD for Sample No. 12 and Sample No. 13 could be obtained in the RD direction. It was found that if the strength and surface properties are equivalent, the bending durability was better when bent in the RD. Accordingly, it was found that in usage in a foldable device, it was preferable that the bending direction was the RD. At this time, control of unevenness from oil marks is important. Exceptional inventiveness regarding the total reduction ratio and number of passes was necessary to satisfy strength.

Sample No. 15 and Sample No. 16 were Steel Material 301 foils of a thickness of approximately 50 µm. It was found through X-ray diffraction and EBSD (electron backscatter diffraction) that these had a similar microstructure to that of Sample No. 3 and formed a multi-phase microstructure of an austenite phase containing a large amount of martensite. The difference between the production methods of Sample No. 15 and Sample No. 16 was the number of rolling passes. As a result, the value of Rz in Sample No. 16 greatly differed. The reason why Rz in Sample No. 15 was comparatively smaller than Sample No. 16 is that due to the lower number of rolling passes, the unevenness from oil marks, in particular, the unevenness at the time of measurement in the rolling direction, became smaller. As a result, the crack evaluation results for the Sample No. 15 were superior, and it is the stainless steel foil of the present invention.

Control of the surface unevenness through the roll roughness and number of passes is effective for controlling the unevenness in the rolling direction (RD) and the transverse direction to that, that is, the TD. Conversely, there is relatively little impact on unevenness in directions other than these. The stainless steel foil of the present invention envisages a reinforcing material attached by adhesive to a flat light emitting electronic element of a foldable device, therefore it is difficult to ensure the bonding strength with the adhesive when the surface roughness is low. Control of the surface unevenness in one direction through the roll roughness and number of passes is effective from the viewpoint of lowering the roughness in the bending direction but ensuring roughness in the other directions to secure adhesion.

Sample Nos. 17 to 19 are examples in which suitable materials are produced and evaluated in the range of a thickness of 30 μm in which the present invention is worked.

It was found that by production achieving both the strength and maximum roughness in the bending direction, it was possible to provide a stainless steel foil with superior durability against even extreme repeated bending conditions of a bending radius of 1.5 to 2.25 mm. By using working rolls with a working roll roughness Ra of 0.1 μm or less and reducing the total reduction ratio to 50%, while setting the rolling speed to 80 m/min or less, work-generated heat at the time of cold working can be suppressed, and a stainless steel foil achieving both strength and roughness with a tensile strength of 1,900 MPa or more and an Rz in that direction of 0.30 μm or less could be produced. By doing this, small bending habit and a durability against 100,000 cycles could be secured under extreme conditions of an R/t of 75 and an unfolding angle of 180°. Furthermore, by keeping the rolling speed to 50 m/min and securing strength while setting the number of passes in final rolling to 5 and reducing the working roll roughness to 0.1 μm or less or even further to 0.08 μm or less, Rz could be made 0.25 μm or further 0.20 μm or less and a durability against 100,000 cycles could be ensured under extreme conditions of a unfolding angle of 180° at an R/t of 75, 67, or even 50.

Sample Nos. 17 to 19 are stainless steel foils comprising an austenite phase and martensite phase, particularly containing a large amount of martensite. These have lamellar structures with crystal grains extending in the rolling direction and a smaller grain diameter in the foil thickness direction, but from the results obtained from EBSD, these appear to be microstructures in which islands of austenite phase distribute in the martensite phase in view of the phase distribution from the foil plane direction. The test is stopped when cracks being to appear, and as a result of polishing and observing the surface of the stainless steel foil and identifying phases through EBSD, it was found that cracks as a whole progressed in the bending ridgeline direction, but austenite phases were observed past the locations where crack progression is impeded, such as where the progression direction changes midway or splits in two. Furthermore, at both sides through which cracks passed, there had been a martensite phase. Cracks progressed while the austenite phase transformed to the martensite phase, and it was found that the austenite phase had the effect of impeding crack progression. A high strength martensite phase formed as a result of strong cold working has the important role of suppressing bending habit under extreme repeated bending conditions, but it is thought that that it was even more effective to suppress progress of cracks by not only reducing roughness in the bending direction perpendicular to the crack progression direction but also by an austenite phase coexisting with a martensite phase being present.

It is difficult to reduce the surface roughness of a high strength stainless steel foil containing a large amount of a martensite phase, but as a result of production in which the Rz in one direction, the bending direction, is reduced rather than seeking a reduction in overall roughness, a stainless steel foil having superior bending durability of the object of the present invention can be realized.

It had been difficult to achieve both the strength and surface properties of the requirements of the present invention under conditions in which rolling speed industrially holds, but in the present examples, the stainless steel foil of the present invention could be obtained based on intensively devised policies by employing rolls with a working roll roughness Ra of 0.3 μm or less, setting the total reduction ratio to 50% or more and 80% or less, the number of passes to 5 or more and 10 or less, and the average rolling speed to 205 m/min or less, and treating the cold rolled material as the final product or conditioning and finishing it under the condition of a TA temperature of 700° or less. More preferably, it was found that rolls controlled to a working roll roughness Ra of 0.1 μm or less may be employed and the total reduction ratio may be set to 65% or more and 80% or less, the number of passes to 5 or more and 8 or less, the average rolling speed to 205 m/min or less, and the TA temperature to 350° C. or more and 700° C. or less.

The invention claimed is:

1. A flexible stainless steel foil comprising rolled stainless steel foil with a thickness of 0.05 mm or less having a tensile strength of 1,800 MPa or more and a maximum height roughness Rz of 0.35 μm or less obtained from a roughness curve of the stainless steel foil surface measured in the same direction as a tensile direction, wherein, a ratio of a maximum valley depth Rv to the Rz (Rv/Rz) is 0.6 or less, and an elongation at break at the time of measurement of the tensile strength is 1% or more and 2% or less.

2. A flexible stainless steel foil comprising rolled stainless steel foil with a thickness of 0.1 mm or less having a tensile strength of 1,800 MPa or more and a maximum height roughness Rz of 0.35 μm or less obtained from a roughness curve of the stainless steel foil surface measured in the same direction as a tensile direction, wherein,
when repeatedly bent 180° at a value satisfying R/t=100 (where R is bending radius (mm) and "t" (mm) is thickness) in the same direction as the tensile direction and then back to 0°,
a number of repeated bending operations until a crack with a length of 5 mm or more is formed on a surface of the stainless steel foil is 100,000 or more, and
bending habit is an opened angle of 170° or more.

3. The flexible stainless steel foil according to claim 1, wherein,
when repeatedly bent 180° at a value satisfying R/t=100 (where R is bending radius (mm) and "t" (mm) is thickness) in the same direction as the tensile direction and then back to 0°,
a number of repeated bending operations until a crack with a length of 5 mm or more is formed on a surface of the stainless steel foil is 100,000 or more, and
bending habit is an opened angle of 170° or more.

4. A flexible stainless steel foil comprising rolled stainless steel foil with a thickness of 0.1 mm or less having a tensile strength of 1,800 MPa or more and a maximum height roughness Rz of 0.30 μm or less obtained from a roughness curve of the stainless steel foil surface measured in the same direction as a tensile direction, wherein
when repeatedly bent 180° at a value satisfying R/t=75 in the same direction as the tensile direction and then back to 0°,
a number of repeated bending operations until a crack with a length of 5 mm or more is formed on a surface of the stainless steel foil is 100,000 or more, and
bending habit is an opened angle of 170° or more when offloading.

5. The flexible stainless steel foil according to claim 1, wherein
the Rz is 0.30 μm or less, and,
when repeatedly bent 180° at a value satisfying R/t=75 in the same direction as the tensile direction and then back to 0°,
a number of repeated bending operations until a crack with a length of 5 mm or more is formed on a surface of the stainless steel foil is 100,000 or more, and
bending habit is an opened angle of 170° or more when offloading.

6. The flexible stainless steel foil according to claim 1, wherein the stainless steel foil comprising, by mass %, C: 0.15% or less, Si: 1.00% or less, Mn: 2.00% or less, P: 0.045% or less, S: 0.030% or less, Ni: 6.00 to 8.00%, Cr: 16.00 to 18.00%, and N: 0.20% or less, and comprising a martensite phase.

7. The flexible stainless steel foil according to claim 5, wherein the stainless steel foil comprising, by mass %, C: 0.15% or less, Si: 1.00% or less, Mn: 2.00% or less, P: 0.045% or less, S: 0.030% or less, Ni: 6.00 to 8.00%, Cr: 16.00 to 18.00%, and N: 0.20% or less, and comprising a martensite phase.

8. A flexible stainless steel foil comprising rolled stainless steel foil with a thickness of 0.1 mm or less having a tensile strength of 1,800 MPa or more and a maximum height roughness Rz of 0.35 μm or less obtained from a roughness curve of the stainless steel foil surface measured in the same direction as a tensile direction, wherein an area ratio of a martensite phase in a cross-section of the stainless steel foil is 50% or more.

9. The flexible stainless steel foil according to claim 1, wherein an area ratio of a martensite phase in a cross-section of the stainless steel foil is 50% or more.

10. The flexible stainless steel foil according to claim 6, wherein an area ratio of a martensite phase in a cross-section of the stainless steel foil is 50% or more.

11. The flexible stainless steel foil according to claim 7, wherein an area ratio of a martensite phase in a cross-section of the stainless steel foil is 50% or more.

12. The flexible stainless steel foil according to claim 1, having a planar shape flexible light emitting electronic element adhered to a surface of the stainless steel foil.

13. The flexible stainless steel foil according to claim 10, having a planar shape flexible light emitting electronic element adhered to a surface of the stainless steel foil.

14. The flexible stainless steel foil according to claim 12, wherein the flexible light emitting electronic element is an organic EL display element.

15. A flexible light emitting device comprising the flexible stainless steel foil of claim 1 and a planar shape flexible light emitting electronic element.

* * * * *